United States Patent Office 3,349,045
Patented Oct. 24, 1967

3,349,045
POLY($\alpha,\alpha,\alpha',\alpha'$-TETRACHLORO-p-XYLYLENE) FILMS
Heinrich G. Gilch, Plainfield, N.J., assignor to Union Carbide Corporation, a corporation of New York
No Drawing. Filed July 9, 1964, Ser. No. 381,563
4 Claims. (Cl. 260—2)

This invention relates to the formation of clear, non-crystalline poly($\alpha,\alpha,\alpha',\alpha'$-tetrachloro-p-xylylene) films. This invention also relates to a new and improved process from which clear, non-crystalline poly($\alpha,\alpha,\alpha',\alpha'$-tetrachloro-p-xylylene) films are readily obtained.

The thermal and chemical stability of poly(p-xylylenes) and, in particular, poly($\alpha,\alpha,\alpha',\alpha'$-tetrachloro-p-xylylene) has created widespread interest. However, since these desired polymers are insoluble in most known solvents and are highly infusible, they could not be easily fabricated by conventional techniques and could not, therefore, be readily produced for commercial use.

It is a specific object of this invention, therefore, to produce a poly($\alpha,\alpha,\alpha',\alpha'$-tetrachloro-p-xylylene) film which can be employed in a variety of commercial applications.

A further object of this invention is to provide a new and improved process whereby the poly($\alpha,\alpha,\alpha',\alpha'$-tetrachloro-p-xylylene) films of the instant invention can be readily obtained.

These and further objects of this invention will become more clear from the ensuing discussion.

Now, in accordance with the instant invention, clear, non-crystalline films of poly($\alpha,\alpha,\alpha',\alpha'$-tetrachloro-p-xylylene) can be obtained according to a new and improved process which comprises passing, at elevated temperatures, $\alpha,\alpha,\alpha,\alpha',\alpha',\alpha'$-hexachloro-p-xylene through a reaction chamber which contains a metal reducing agent; isolating the metal halide compound which is formed; depositing the vapors containing the resulting reactive intermediary $\alpha,\alpha,\alpha',\alpha'$-tetrachloro-p-xylylene diradicals on a surface maintained at a temperature of above about 85° C. and then heating the said surface until polymerization is completed to obtain a clear, non-crystalline film of poly ($\alpha,\alpha,\alpha',\alpha'$-tetrachloro-p-xylylene).

The poly($\alpha,\alpha,\alpha',\alpha'$-tetrachloro-p-xylylene) films obtained in accordance with the instant process have been found to exhibit significantly better chemical and thermal stability when compared to other similar films as, for example, unsubstituted poly(p-xylylene) films.

Heretofore, when $\alpha,\alpha,\alpha,\alpha',\alpha',\alpha'$-hexachloro-p-xylene was employed as the starting material, it was found that the resulting reactive intermediary $\alpha,\alpha,\alpha',\alpha'$-tetrachloro-p-xylylene diradicals had a tendency to form yellow, needle-shaped crystals of $\alpha,\alpha,\alpha',\alpha'$-tetrachloro-p-xylylene when deposited at about room temperature and below. Upon subjecting these crystals to heat at temperatures in excess of about 100° C., it was found that these crystals immediately turned white indicating the formation of poly ($\alpha,\alpha,\alpha',\alpha'$-tetrachloro-p-xylylene). However, the polymer obtained in this manner still retained its original needle-shaped form and no film was obtained. Additionally, this form of the polymer was found to be infusible and insoluble in known solvents which prevented its further fabrication by known techniques into useful films.

Now, in accordance with the instant process, when reactive intermediary $\alpha,\alpha,\alpha',\alpha'$-tetrachloro-p-xylylene diradicals obtained from $\alpha,\alpha,\alpha,\alpha',\alpha',\alpha'$-hexachloro-p-xylene are deposited on a surface which is maintained at a temperature of above about 85° C., clear, non-crystalline poly ($\alpha,\alpha,\alpha',\alpha'$-tetrachloro-p-xylylene) films are formed spontaneously upon contacting the said surface.

The $\alpha,\alpha,\alpha,\alpha',\alpha',\alpha'$-hexachloro-p-xylene employed as the starting material in the instant process is commercially obtainable in crystalline form. Upon being subjected to the temperatures employed herein, it readily sublimes thereby facilitating its passage through the reaction chamber in the instant process.

Hence, at the outset of the instant process, the reaction chamber containing the metal reducing agent is pre-heated to temperatures of between about 400° C.–600° C. and, preferably, between 450° C.–550° C. Although temperatures below about 400° C. and above about 600° C. can be employed and the process remain operable, they are not desirable. At temperatures below about 400° C., there is less conversion of the $\alpha,\alpha,\alpha,\alpha',\alpha',\alpha'$-hexachloro-p-xylene into vapors containing the reactive intermediary $\alpha,\alpha,\alpha',\alpha'$-tetrachloro-p-xylylene diradicals. Temperatures above about 600° C., result in premature decomposition of the $\alpha,\alpha,\alpha,\alpha',\alpha',\alpha'$-hexachloro-p-xylene and undesirable side reactions which are detrimental to the process. Hence, for optimum results, it is preferable to employ the temperature ranges set forth hereinabove.

Although not narrowly critical, it is also desirable in this process to maintain a pressure in the system of between about 0.01–1.0 mm. Hg and, preferably, between about 0.1–0.5 mm. Hg. At pressures below about 0.01 mm. Hg, essentially no condensation of poly($\alpha,\alpha,\alpha',\alpha'$-tetrachloro-p-xylylene) occurs. At pressures above about 1.0 mm. Hg, decomposition of the $\alpha,\alpha,\alpha,\alpha',\alpha',\alpha'$-hexachloro-p-xylene is attended with the formation of interfering side products which also act to decrease the amount of polymer film obtainable.

The pressure in the system can be readily measured at the outlet end of the reaction chamber with conventional means. As employed herein, the term "pressure" is understood to mean that pressure which is taken at this point in the system; namely, the pressure at the outlet end of the reaction chamber.

The use of a metal reducing agent in the reaction chamber of the instant invention gives rise to a new and improved process that is simple, readily controllable, economic and which is commercially feasible. Furthermore, all the attendant limitations inherent in pyrolytic processes, such as the employment of high temperatures of between about 900°C.–1000° C., narrow tolerances in the control conditions of the system, low yields of polymer obtainable and so forth are avoided. Additionally, the reactive intermediary $\alpha,\alpha,\alpha',\alpha'$-tetrachloro-p-xylylene diradicals could not be obtained in pyrolytic processes by homolytic cleavage of the chlorine constituents when $\alpha,\alpha,\alpha,\alpha',\alpha'\alpha'$-hexachloro-p-xylene was employed as the starting material.

In pyrolysis techniques, homolytic cleavage is a direct result of the high temperatures employed whereas, in the instant process, the chlorine constituents in the $\alpha$ positions of the $\alpha,\alpha,\alpha,\alpha',\alpha',\alpha'$-hexachyoro-p-xylene starting compound react directly with the metal reducing agent in the reaction chamber to result in an entirely different process. Hence, the use of metal reducing agents in the instant process not only permits the employment of lower temperatures but also gives rise to a process that is readily controllable and which results in obtaining high yields of polymer film.

Generally, the metal reducing agents which can be employed in this process are those which will effectively reduce the chlorine constituents in the $\alpha$ positions of the starting compound and which are capable of yielding volatile and readily sublimable halide compounds. Among the metals which can be employed for this purpose are those such as copper, zinc, aluminum, tin, and so forth. In the practice of this invention, copper is a particularly preferred reducing agent since the resulting vaporous cuprous chloride compound which forms has been found to be volatile and readily sublimable. Isolation of this compound from the system is thereby facilitated permitting the process to continue without interference from or losses due to undesirable side reactions.

The amount of metal reducing agent employed is not narrowly critical but should be present in the reaction chamber in an amount sufficient to assure that all of the starting material is reacted. For best results, the amount of metal reducing agent employed should be present in excess of the stoichiometric amount theoretically required to react all of the starting material employed.

The physical form in which the metal reducing agent is employed is also not critical. Generally, it should be in a form which provides the greatest amount of surface area. It should also be inserted in the reaction chamber in such a manner as to prevent a severe pressure drop between the inlet and outlet ends of the reaction chamber. Physical forms of the metal reducing agent such as small particles, strips, shavings and so forth are acceptable. It has been found, however, that when the metal reducing agent is in mesh form and is loosely packed in the reaction chamber, good results are obtained and this form is, therefore, preferred.

The vapors formed within the reaction chamber of the instant process upon heating the $\alpha,\alpha,\alpha,\alpha',\alpha',\alpha'$-hexachloro-p-xylene contain reactive intermediary $\alpha,\alpha,\alpha',\alpha'$-tetrachloro-p-xylylene diradicals having the general structure,

In addition to these reactive intermediary diradicals, there is also formed, the vaporous metal chloride compound as a result of reacting the $\alpha,\alpha,\alpha,\alpha',\alpha',\alpha'$-hexachloro-p-xylene with the metal reducing agent contained in the reaction chamber. The vaporous metal halide compound is then isolated from the vapors containing the reactive intermediary diradicals in order to obtain the clear, non-crystalline polymer film of the instant invention. Isolation can be conveniently accomplished by passing the mixed vapors over a relatively cool surface which is maintained at a temperature above the condensation temperature of the reactive intermediary diradicals and permitting the vaporous metal chloride compound to deposit on this surface while the vapors containing the reactive intermediary diradicals continue unaffected through the remainder of the system.

Illustrative of the manner in which the vaporous metal chloride compound can be isolated is to provide a glass tube at the outlet end of the reaction chamber through which the vaporous mixture is passed. However, caution should be exercised that the surface temperature of the glass tube is maintained at a temperature which is above the condensation temperature of the reactive intermediary diradicals in order to avoid deposition of the reactive intermediary diradicals together with the vaporous metal chloride compound. Generally, this temperature should be between about 150° C.–350° C. and, preferably, between about 200° C.–300° C. At temperatures below about 150° C., poly($\alpha,\alpha,\alpha',\alpha'$-tetrachloro-p-xylylene) will condense and deposit along with the metal halide compound which will interfere with the system by preventing a clear separation of the metal halide compound from the reactive intermediary diradicals and result in obtaining polymer films of inferior quality. Temperatures above about 350° C. are substantially ineffective to isolate the metal chloride compound. Hence, as the hot, mixed vapors pass over the relatively cool surface, the metal chloride compound deposits spontaneously and is thus readily isolated from the vapors containing the reactive intermediary $\alpha,\alpha,\alpha',\alpha'$-tetrachloro-p-xylylene diradicals.

In order to further assure that the metal halide compound is completely isolated, a filter can be provided at the end of the zone where the metal halide compound is deposited. Suitable filters for this purpose can be selected from those materials which will not react with either of the reaction products such as brass, iron, stainless steel, copper, glass, and so forth. The filter can be employed in any convenient form such as a screen, strips, mesh, small particles and so forth.

Hence, as the metal halide compound is thus isolated from the system, the vapors containing the reactive intermediary $\alpha,\alpha,\alpha',\alpha'$-tetrachloro-p-xylylene diradicals are conducted to a second, relatively cooler surface and deposited thereon. This second surface is maintained at a temperature of between about 85° C.–200° C. and, preferably, between about 100° C.–150° C. At temperatures below about 85° C., the reactive intermediary diradicals will condense to form crystals of $\alpha,\alpha,\alpha',\alpha'$-tetrachloro-p-xylylene which slowly turn white forming poly($\alpha,\alpha,\alpha',\alpha'$-tetrachloro-p-xylylene) which cannot be further fabricated. If temperatures above about 200° C. are employed, the vapors containing the reactive intermediary diradicals will not condense and deposit on the cool surface preventing the formation of the polymer film.

After the reactive intermediary diradicals have been deposited on the second cool surface, the temperature of this deposition surface is then raised to between about 150° C.–250° C.

If temperatures above about 250° C. are employed, decomposition of the polymer is likely to occur. At temperatures below about 150° C., polymerization continues only at an extremely slow rate. When temperatures of about 100° C. were employed, it was found that polymerization could not be completed.

Temperatures of between about 150° C.–250° C. are then maintained for a period of between about 40–120 minutes and, perferably, between about 60–90 minutes. During this interval, polymerization is completed and a clear, non-crystalline film of poly($\alpha,\alpha,\alpha',\alpha'$-tetrachloro-p-xylylene) is obtained.

These films have been found to exhibit highly desirable physical, chemical and electrical properties. For example, these films have been found to be clear, non-crystalline and have a tensile strength of between about 5000 p.s.i.–8000 p.s.i. and a tensile modulus of about 475,000 p.s.i. which are only moderately affected when exposed to high temperatures. These films have also been found to be highly resistant to strong mineral acids and impervious to oxidation with strong oxidizers, such as mixtures of nitric acid, hydrochloric acid and peroxide, as well as strong bases, such as a solution consisting of 50% potassium hydroxide in water.

Electrically, these films have been found to exhibit a dielectric strength of about 500 volts per mil film thickness, a dielectric constant of about 2.81 as measured from between about 60 cycles to 100 kilocycles, and a dissipation factor of from between about $2.67 \times 10^{-4}$ to $2.21 \times 10^{-4}$ as measured from between about 60 cycles to 100 kilocycles.

Tensile modulus and tensile strength of the films were determined according to ASTM D–882–61T, method A; the dielectric constant and dissipation factor of the films were determined according to ASTM D–150 while the break-down voltage was ascertained according to ASTM D–149.

Hence, all reference herein to tensile modulus, tensile strength, dielectric constant, dissipation factor and breakdown voltage of the poly($\alpha,\alpha,\alpha'\alpha'$-tetrachloro-p-xylylene) films are understood to have been determined and ascertained in accordance with the test methods identified and set forth immediately hereinabove.

The poly($\alpha,\alpha,\alpha',\alpha'$-tetrachloro-p-xylylene) films of the instant invention can be readily employed to impregnate textile fabrics, as a coating for metals, plastics and so forth or may, in accordance with the instant process, be utilized as an encapsulator for various objects.

The following examples are illustrative of the manner in which the poly($\alpha,\alpha,\alpha',\alpha'$-tetrachloro-p-xylylene) films of the instant invention are obtained and are not to be construed as being limitative thereof. Unless otherwise specified, all parts and percentages are by weight.

Example I

Through a reaction chamber packed with copper mesh and preheated to maintain a temperature of 525° C. was passed a commercially obtained sample of $\alpha,\alpha,\alpha,\alpha',\alpha',\alpha'$-hexachloro-p-xylene. The pressure in the system was maintained at 0.5 mm. Hg.

The vapors, which formed in the reaction chamber, were then passed through a glass tube which was maintained at a temperature of 275° C. by means of an electric heating tape. Cuprous chloride was deposited on the walls of the tube while the remaining vapors were passed through a copper mesh filter and then conducted into a deposition chamber. The deposition chamber was maintained at a temperature of 120° C. A clear film formed on the walls of the deposition chamber.

The surface temperature of the deposition chamber was then raised to 180° C. and maintained at this level for 60 minutes. At the end of this period, there was formed, on the surfaces of the deposition chamber, a clear, non-crystalline film of poly($\alpha,\alpha,\alpha',\alpha'$-tetrachloro-p-xylene) in an amount of 93% of the theoretical amount of the reactive intermediary $\alpha,\alpha,\alpha',\alpha'$-tetrachloro-p-xylylene diradical.

Elemental analysis of the film, which showed it to be consistent with poly($\alpha,\alpha,\alpha',\alpha'$-tetrachloro-p-xylylene), was as follows:

Calculated: 39.68% C; 1.65% H; 58.67% Cl. Found: 39.78% C; 1.70% H; 59.08% Cl.

The film exhibited a tensile strength of 8000 p.s.i. and exhibited no discoloration when heated to temperatures of between 250° C.–280° C. Thermal stability of the film was measured by subjecting it to a temperature of 180° C. for a period of two days. No visible change was discernible in the film. The film was tested for crystalline formation by observing it under X-ray diffraction. No crystallinity was discernible since the characteristic crystalline pattern was not formed.

The electrical properties of the film were also obtained and were found to be as follows:

Dielectric constant—2.71, measured from 60 cycles to 100 kilocycles.

Dissipation factor—$9.3 \times 10^{-4}$–$3.5 \times 10^{-4}$, measured from 60 cycles to 100 kilocycles.

Break-down voltage—550 volts per mil of film thickness.

Examples II–XI

The same procedure was followed as in Example I above. The results of these examples, obtained at various temperatures and pressure, are set forth in Table A below. In Table A, the amount of poly($\alpha,\alpha,\alpha',\alpha'$-tetrachloro-p-xylylene) film obtained is expressed in terms of the percent yield from the theoretical amount of the reactive intermediary $\alpha,\alpha,\alpha',\alpha'$-tetrachloro-p-xylylene diradical.

TABLE A

| Example | Pressure (mm. Hg) | Temperature (° C.) | Percent Yield of poly($\alpha,\alpha,\alpha',\alpha'$-tetrachloro-p-xylylene) film |
| --- | --- | --- | --- |
| II  | 0.1 | 300 | 0.8 |
| III | 0.1 | 400 | 19.0 |
| IV  | 0.1 | 500 | 91.5 |
| V   | 0.1 | 600 | 87.0 |
| VI  | 0.3 | 300 | 11.8 |
| VII | 0.3 | 400 | 22.0 |
| VIII| 0.3 | 500 | 91.0 |
| IX  | 0.3 | 600 | 83.0 |
| X   | 1.0 | 400 | 35.0 |
| XI  | 1.0 | 500 | 51.0 |

Films of the poly($\alpha,\alpha,\alpha',\alpha'$-tetrachloro-p-xylylene) as obtained from Examples I, IV, V, VIII and IX in accordance with the instant invention were subjected to further tests to measure their tensile strength and tensile modulus. The films thus tested exhibited a tensile strength of between about 5000 p.s.i. to 8000 p.s.i. and a tensile modulus of about 475,000 p.s.i. After aging in air for 60 hours at a temperature of about 195° C., the films were found to exhibit a tensile strength of about 4500 p.s.i. and a tensile modulus of between about 200,000 p.s.i.–400,000 p.s.i.

Similarly, the electrical properties of these films were also measured. Generally, they were found to exhibit a dielectric strength of about 500 volts per mil of film thickness. Other significant electrical properties exhibited by these films are set forth in Table B below.

TABLE B

| No. of Cycles | Dielectric Constant | Dissipation Factor |
| --- | --- | --- |
| 60 | 2.81 | $2.67 \times 10^{-4}$ |
| 1 kilocycle | 2.81 | $2.54 \times 10^{-4}$ |
| 10 kilocycles | 2.81 | $2.24 \times 10^{-4}$ |
| 100 kilocycles | 2.81 | $2.21 \times 10^{-4}$ |

These films were also heated for 500 hours at a temperature of about 175° C. It was found that their dissipation factor increased by about a factor of 3 while the break-down voltage remained substantially constant.

While the invention has been described in detail and with particularity, it should be understood that changes, alternations and modifications may be made in the procedures, compositions and methods set forth herein and that the properties and characteristics of the polymer films may be varied without departing from the spirit and scope of the invention as set forth in the appended claims.

What is claimed is:

1. A process for the preparation of poly($\alpha,\alpha,\alpha',\alpha'$-tetrachloro-p-xylylene) films which comprises
   (1) passing $\alpha,\alpha,\alpha,\alpha',\alpha',\alpha'$-hexachloro-p-xylene through a reaction chamber containing a metal reducing agent selected from the group consisting of copper, zinc, aluminum and tin and which is maintained at a temperature of between about 400° C.–600° C. and at a pressure between about 0.01 to 1 mm. Hg to form a vaporous mixture containing reactive intermediary $\alpha,\alpha,\alpha',\alpha'$-tetrachloro-p-xylylene diradicals and a vaporous metal chloride compound;
   (2) passing the mixture of said vapors over a surface which is maintained at a temperature of between about 150° C.–350° C. to deposit the vaporous metal chloride compound on said surface;
   (3) depositing the vapors containing the reactive intermediary $\alpha,\alpha,\alpha',\alpha'$-tetrachloro-p-xylylene diradicals on a second surface which is maintained at a temperature of between 100° C.–200° C.;
   (4) heating said second surface to a temperature of between about 150° C.–250° C. for a period of between about 40 to 120 minutes; and
   (5) recovering from said second surface a film of clear, non-crystalline poly($\alpha,\alpha,\alpha',\alpha'$ - tetrachloro-p-xylylene).

2. The process of claim 1 wherein the vapors containing the reactive intermediary $\alpha,\alpha,\alpha',\alpha'$-tetrachloro-p-xylylene diradicals are passed through a filter prior to being deposited on said second surface.

3. A process for the production of poly($\alpha,\alpha,\alpha',\alpha'$-tetrachloro-p-xylylene) films which comprises
   (1) passing $\alpha,\alpha,\alpha,\alpha',\alpha',\alpha'$-hexachloro-p-xylene through a reaction chamber packed with copper mesh and heated to a temperature of between about 400° C.–600° C. and at a pressure between about 0.01 to 1 mm. Hg to form vaporous mixture containing reactive intermediary $\alpha,\alpha,\alpha',\alpha'$-tetrachloro-p-xylylene diradicals and vaporous cuprous chloride;
   (2) passing the mixture of said vapors over a surface which is maintained at a temperature of between about 200° C.–300° C. to deposit the cuprous chloride compound on said surface;
   (3) passing the vapors containing the reactive intermediary $\alpha,\alpha,\alpha',\alpha'$-tetrachloro - p - xylylene diradicals through a copper mesh filter to deposit any remaining cuprous chloride compound present;

(4) depositing the vapors containing the reactive intermediary $\alpha,\alpha,\alpha',\alpha'$-tetrachloro-p-xylylene diradicals on a second surface which is maintained at a temperature of between about 100° C.–200° C.;

(5) heating said second surface to a temperature of between about 150° C.–250° C. for a period of between about 40 to 120 minutes; and (6) recovering from said second surface a film of clear, non-crystalline poly($\alpha,\alpha,\alpha',\alpha'$-tetrachloro-p-xylylene).

4. The process of claim 3 wherein the reaction chamber is heated to a temperature of between about 450° C.–550° C.

References Cited

UNITED STATES PATENTS

| | | | |
|---|---|---|---|
| 3,240,722 | 3/1966 | Orttung et al. | 260—2 |
| 3,280,202 | 10/1966 | Gilch | 260—2 |

FOREIGN PATENTS 1,312,376  11/1962  France.

SAMUEL H. BLECH, *Primary Examiner.*